United States Patent [19]

Smith, Jr.

[11] Patent Number: 4,554,629
[45] Date of Patent: Nov. 19, 1985

[54] PROGRAMMABLE TRANSFORM PROCESSOR

[76] Inventor: Winthrop W. Smith, Jr., 100 Mariner Way, Maitland, Fla. 32751

[21] Appl. No.: 468,336

[22] Filed: Feb. 22, 1983

[51] Int. Cl.[4] .................. G06F 9/00; G06F 11/00; G06F 7/38
[52] U.S. Cl. ................... 364/200; 364/725; 364/728
[58] Field of Search ... 364/200 MS File, 900 MS File, 364/725, 726, 727, 728

[56] References Cited

U.S. PATENT DOCUMENTS

| | | | |
|---|---|---|---|
| 3,748,451 | 7/1973 | Ingwersen | 364/726 |
| 3,812,470 | 5/1974 | Murtha et al. | 364/200 |
| 3,875,391 | 4/1975 | Shapiro et al. | 364/726 |
| 3,952,186 | 4/1976 | Speiser et al. | 364/726 |
| 4,328,555 | 5/1982 | Nussbaumer | 364/726 |
| 4,393,457 | 7/1983 | New | 364/726 |

Primary Examiner—James D. Thomas
Assistant Examiner—William G. Niessen
Attorney, Agent, or Firm—William M. Hobby, III

[57] ABSTRACT

A programmable transform processor apparatus is disclosed which has an input and output for receiving and transmitting data and a data storage hardware for storing input data, as well as intermediate transform results. Arithmetic processing hardware processes input signals and has a multiplier accumulator having the multiplication function performed as a sequence of products combined in the accumulator portion of the multiplier accumulator simultaneous with the accumulator, accumulating the sum of the products therein. Data control hardware is operatively connected to the input/output means and to the data storage means and the arithmetic processing means for controlling the input and output of data for the input and output and the operation of the arithmetic processing hardware and the control of data to and from the data storage hardware.

4 Claims, 6 Drawing Figures

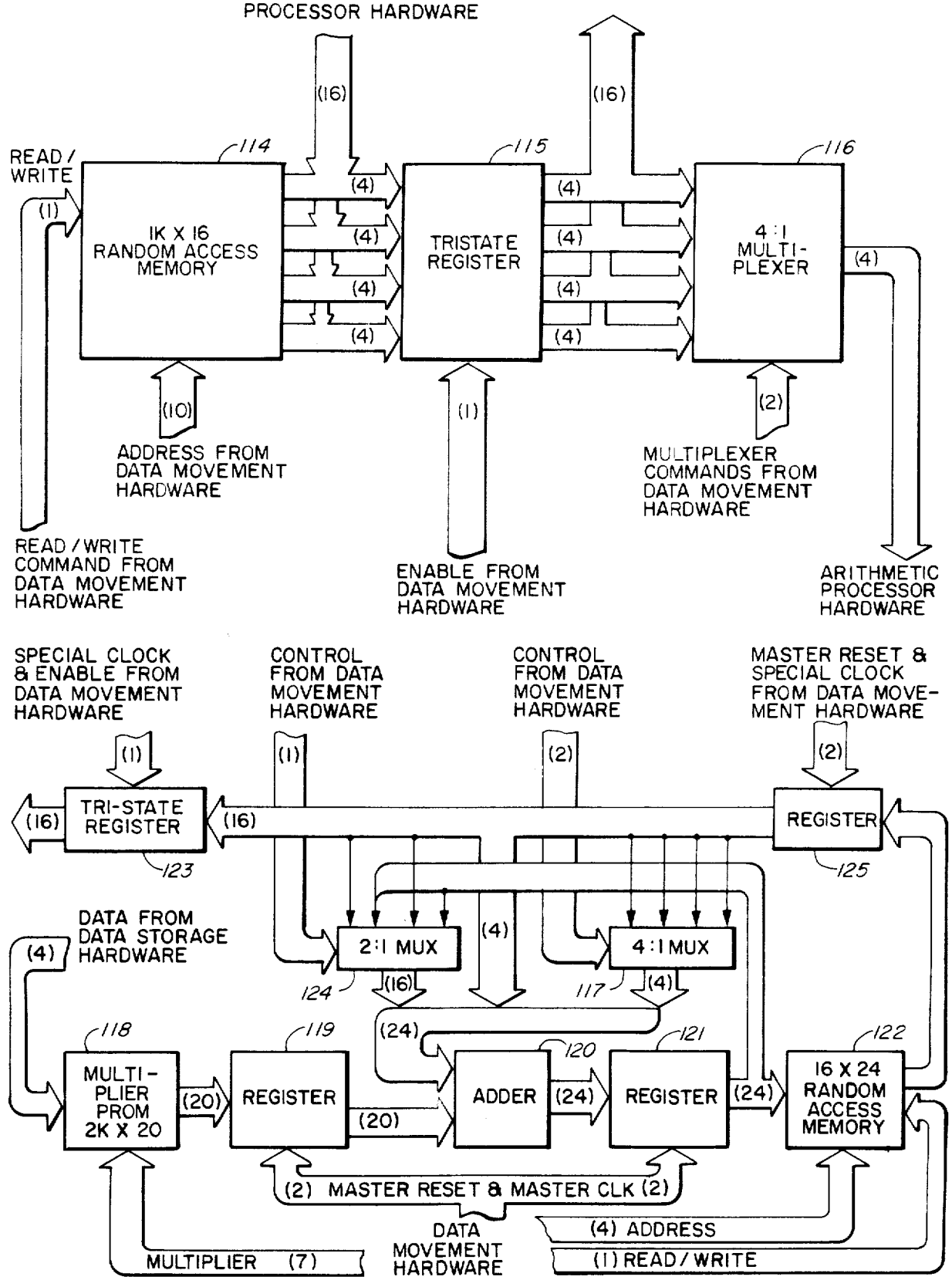

4,554,629

PROGRAMMABLE TRANSFORM PROCESSOR

BACKGROUND OF THE INVENTION

The present invention relates to programmable transform processors and more particularly to a novel transform processing method and system that analyzes the characteristics of a signal in electrical form. The analysis techique transforms the signal into another representation such as the discrete Fourier Transform or discrete cosine transform that produce a frequency domain representation of the signal.

All linear transformations can be represented as a matrix operation ($B_{ij}$) on a signal vector ($a_j$) to produce a different vector ($A_j$) in another domain.

$$A_j = \sum_{i=0}^{n-1} a_j B_{ij}$$

Fourier, Walsh, Hadamard, Haar, cosine and sine transforms are examples of linear transformations. Filtering algorithms, such as Sobel, Roberts, linear predictive coding and general correlation processes, also fall into this class. These operators are used in the analysis and recognition of speech waveforms, the bandwidth reduction and enhancement of imagery, the deconvolution of complex seismic waveforms, vibration analysis of mechanical structures and numerous other computationally intense operations.

Often these transformations have sufficient structure to be decomposed into a sequence of transforms that afford an overall reduction in computational complexity. Fourier transforms being represented as a multidimensional decomposition and correlation filtering being decomposed into a sequence of simpler filters are two examples of this approach to transform processing.

Early solutions to performing this type of transform processing fell into two classes. First, for high speed real time processing, dedicated signal processing hardware was designed. It had the attributes of the highest speed and smallest volume but the drawbacks of having no algorithm flexibility and high initial design cost because a new implementation was required to perform each new function. At the other extreme, general purpose computers were programmed to perform signal processing tasks in a non-real time laboratory environment when speed and size were not at issue. This provided the flexibility of general purpose processing with only modifications to operational software. However, the approach severely compromised the speed and size characteristics of the hardware and required a complex software development system to fully utilize the inherent flexibility.

In recent years the programmable signal processor has been developed as a compromise to these two architectural extremes. These devices are centered around a multiply-accumulator that is accessed by a general purpose microprocessor for higher computational capability than what is available from a general purpose computer and more flexibility than a special purpose processor. These processors still require the complexity of a software development system to take advantage of the microprocessor's flexibility. They also require the hardware complexity of a dedicated multiplier which is costly in size, power and price and is inactive for a significant percentage of transform computations such as Fourier, Walsh, Hadamard and Haar. This leads to under utilization of computational resources and therefore inefficient processing. These systems also generally fail to address the need for efficient nonlinear operations such as limiting, thresholding and logarithmic processing.

SUMMARY OF THE INVENTION

A programmable transform processor apparatus is disclosed which has an input and output for receiving and transmitting data and a data storage hardware for storing input data, as well as intermediate transform results. Arithmetic processing hardware processes input signals and has a multiplier accumulator having the multiplication function performed as a sequence of products combined in the accumulator portion of the multiplier accumulator simultaneous with the accumulator, accumulating the sum of the products therein. Data control hardware is operatively connected to the input/output means and to the data storage means and the arithmetic processing means for controlling the input and output of data for the input and output and the operation of the arithmetic processing hardware and the control of data to and from the data storage hardware. The data control hardware includes a plurality of sequencing circuits for addressing the data storage hardware with each of the sequencing circuits having a plurality of address sequences for individually developing a portion of a data storage address, and each sequencing circuit having a plurality of preprogrammed sequences operatively coupled to a register for holding a partial memory address, each register being coupled to a data storage hardware. Each of the plurality of sequencing circuits is coupled to at least one other sequencing circuits for allowing each sequencing circuit to operate singularly or simultaneously with at least one other sequencing circuit so that one, two, or three dimensional data can be sequenced to and from the data storage hardware.

The multiplier accumulator accumulates partial multiple products and the sum of the accumulated multiplier products and also includes an adder for adding the partial multiplier products and the sum of the accumulated multiplier products. The multiplier accumulator also has an accumulation register having a plurality of storage locations therein.

BRIEF DESCRIPTION OF THE DRAWINGS

Other objects, features and advantages of the present invention will be apparent from the written description and the drawings, in which:

FIG. 4 is a block diagram of the data storage function of the programmable transform hardware;

FIG. 5 is a block diagram of the arithmetic processing hardware; and

DESCRIPTION OF THE PREFERRED EMBODIMENT

The programmable transform logic (PTL) description will be in two steps. First the basic data flow and functional description of each major portion of the invention will be described. Then a more detailed implementation example will be described. This implementation description is not meant to limit the scope of the invention but only to more explicitly illustrate one preferred implementation approach.

Figure 1:
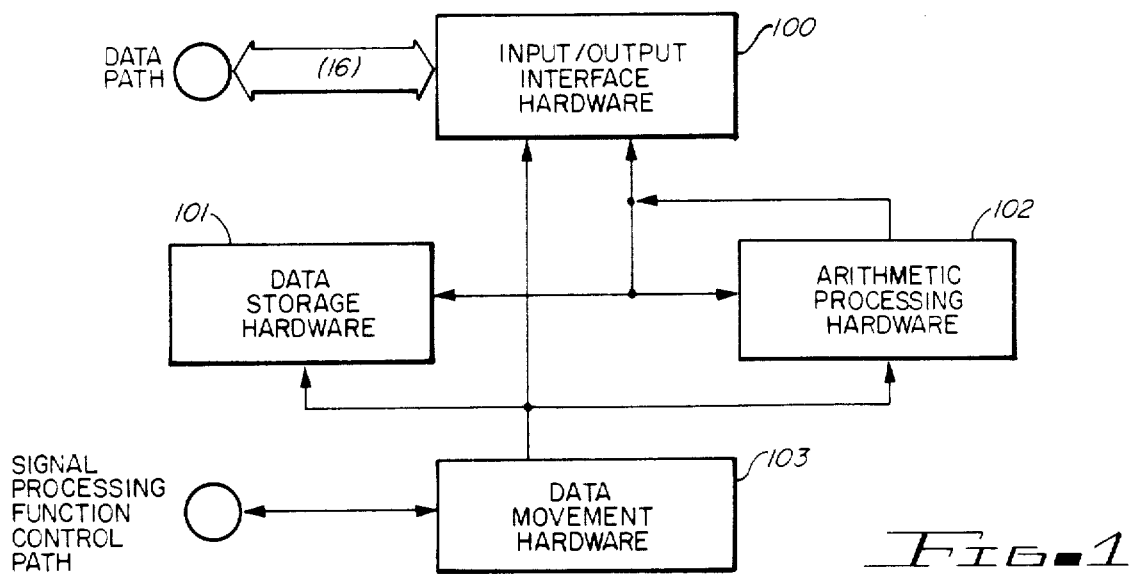
FIG. 1 is a block diagram of a programable transform processor in accordance with my invention.

FIG. 1 shows the four basic functional blocks that implement the programmable transform logic (PTL) invention and how they are interconnected.

The purpose of the Input/Output Interface Hardware 100 is to provide the interface between the data source/receiver and the PTL computational hardware. This interface may be bidirectional as shown in FIG. 1 when the PTL invention is used as a peripheral to a host computer or the interface may have unidirectional inputs and outputs for pipeline hardware applications. When input data is received it is sent to the data storage hardware 101 directly or it can be routed through the arithmetic processing hardware 102 for appropriate preconditioning 104, 108.

The data storage hardware 101 is a random access memory that stores input data and also stores intermediate results from the arithmetic processor 102 between steps in the signal processing computation. This allows the user to take direct advantage of the basic signal processing tool of decomposing a complex problem into a sequence of simpler problems.

The arithmetic processing hardware 102 performs all the required signal processing computations. Multiplication is performed as a table lookup function to reduce quantization effects and hardware costs and increase hardware flexibility by allowing the use of other operators such as nonlinear ones with only PROM replacement or reprogramming. Accumulation can be performed in numerous classical adder plus memory configurations.

The data movement hardware 103 makes efficient use of PROM technology to control the movement and location of data in and out of the data memory, as well as through the arithmetic processor and I/O port.

Figure 2:
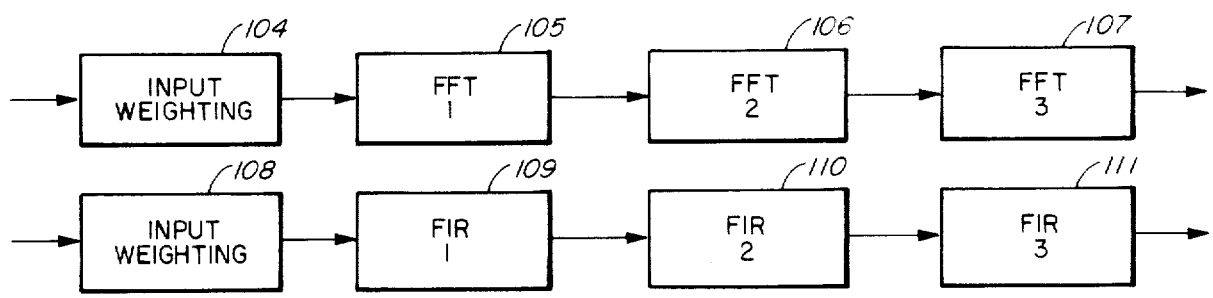
FIG. 2 is a block diagram of a multidimensional signal processor.

Typically applications of the PTL hardware are fast Fourier transforms (FFT) and finite impulse response filters (FIR) which signal processing users typically like to decompose into a sequence of operations as shown in FIG. 2 (105, 106, 107, 109, 110, and 111)

The operations shown in FIG. 2 may be for implementing a multidimensional (three in this case) signal processing function or for three steps in the decomposition of a one dimensional signal processing function. In either case, the sequence of steps performed by PTL is as follows:

1. Indicate to host computer via the data movement hardware 103 that PTL is ready to accept data.

2. Receive basic signal processing function data through the data movement hardware 103 to initialize PTL and tell it the kind of function to be performed, how many stages are involved, the length of those stages and the computational coefficients required in each stage. A seven bit mode word and an initialization pulse are required to perform those functions in one preferred implementation.

3. Receive data through the input/output interface hardware 100 with a handshake for each piece of data to assure that the next piece is not sent until the last is received.

4. The data movement hardware 103 then routes the data through the arithmetic processing hardware 102, routes the proper multiplier constants to the arithmetic processing hardware 102 for performing the "input weighting" step 104, 108 (in FIG. 2) and controls the movement of the data through the arithmetic processing hardware 102 and routes it out of that hardware and into its proper location in the data storage hardware 101 so that it is ready for stage 1 of the FFT 105 or FIR 109 computations.

5. The data movement hardware 103 then accesses data from the data storage hardware 101 in the proper address sequence and feeds it into the arithmetic processing hardware 102 along with the proper multiplicative coefficients to perform the first stage of FFT 105 or FIR 109 signal processing. It additionally controls the movement of data through the arithmetic processing hardware 102 and routes it back to the same locations in memory from which the data was extracted in the data storage hardware 101 when the first stage of computation is complete. Depending on the particular signal processing function, the data may come out of memory 101 in a number of small chunks on which the first stage of processing is performed. In this case, each small chunk is processed and returned to memory 101 before the next is extracted. This leads to a very orderly approach to the processing which allows the user to more easily conceptualize performing his functions in PTL.

6. When the first step computations 105 and 109 are complete, the data movement hardware 103 automatically switches over to the data and multiplicative sequence required to perform the second set of computations 106, 110 in the sequence and proceeds with step 5 again. This continues until all of the processing is complete and all data is back in the data storage hardware 101.

7. The final step is to output data. This is accomplished by establishing the proper protocol via the data movement hardware 103 and then having the data movement hardware 103 access data in the proper order from the data storage hardware 101 and steer it through the input/output interface hardware 100 to the receiving processor.

Figure 3:
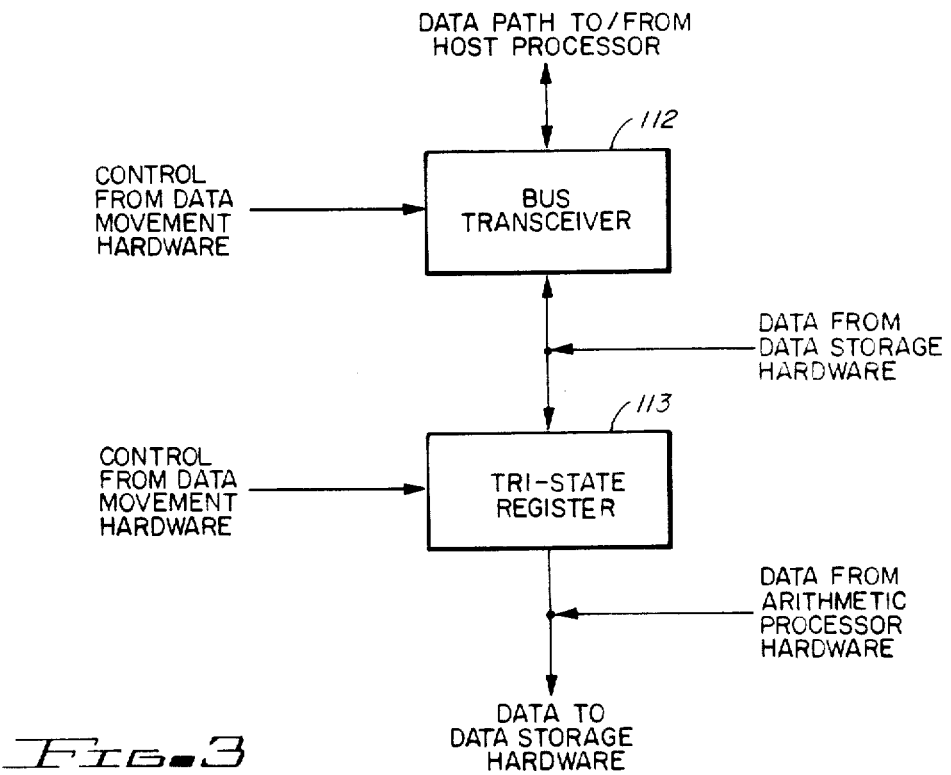
FIG. 3 is a block diagram of the input/output interface hardware.

FIG. 3 shows a block diagram of a preferred implementation of the input/output interface hardware 100.

The control signals from the data movement hardware 103 to the bus transceiver 112 are used to tell it whether it is sending or receiving data and also to turn on or off its tristate output. This second function is important in this particular PTL implementation because the tristate lines that feed data to the bus transceiver 112 from the data storage hardware 101 are also used to feed data from the data storage hardware 101 into the arithmetic processor hardware 102 and therefore cannot be disturbed by data from the bus transceiver 112. The control signals from the data movement hardware 103 to the tristate register 113 enable it only during the time that data is actually being received from the host processor. This is because its data lines are connected to tristate data lines that return data to the data storage hardware 101 from the arithmetic processor hardware 102. Therefore, these lines must be turned off during the input sequence to allow the windowed data to be stored in the data storage hardware 101 as well as during the signal processing data computation steps when data is flowing in and out of the data storage hardware 101 almost constantly. It must also be disabled during the output step because data is flowing out of the data storage hardware 102 to the bus transceiver 112 through a tristate register in the data storage hardware 101.

FIG. 4 is a block diagram of a preferred implementation of the hardware in PTL that performs the data storage function 101.

The 1k×16 memory 114 was chosen as a baseline for the preferred implementation of PTL because most signal processing problems do not require more bits (16) and the 1k addresses allow the computation for up to 512 complex points or 1024 real points with proper sequencing of the data movement hardware. Clearly, there are no fundamental limitations on the memory size in the PTL architecture. The memory used in this design has a bidirectional input/output port that is active to receive data during the write mode and actively outputs data during the read mode. This means that the read/write command is coordinated with the tristate enable logic of the input/output interface hardware 100 and the arithmetic processor hardware 102 so that a bus conflict does not occur at the output of the RAM.

The enable bit to the tristate register 115 must be coordinated with the enable to the transceiver 112 in the input/output interface hardware 100 so that this tristate register 115 is not enabled when inputting data from the host processor. The logic is set up so that this input time slot is the only time that this tristate register 115 is not enabled.

The 4:1 multiplexer 116 provides the interface between the data storage hardware 101 and the arithmetic processor hardware 102 which processes data in four bit chunks of the sixteen bit word. As each word from memory 114 is stored in the tristate register 115, the multiplexer 116 displays its least significant four bits to the arithmetic processor hardware 102 followed by the next four bits, the next four bits and finally, the most significant four bits before receiving a new word from the 1k×16 memory 114.

FIG. 5 is a preferred implementation of the arithmetic processing hardware 102. Multiplication is performed as a four step "shift and add" of two's complement numbers using the multiplier PROM 118 and the the adder register 121 and 2:1 multiplexer 115 scheme shown in FIG. 5. To understand the scheme we represent the number "x" by its two's complement equivalent in equation 2 (assuming that the number is fifteen bits plus sign).

$$X = -X_{15}2^{15} + \sum_{i=0}^{14} X_i 2^i \quad (2)$$

Equation 2 can be rewritten in four bit chunks as:

$$X = \left(-X_{15}2^{15} + \sum_{i=12}^{14} X_i 2^i\right) + \left(\sum_{i=8}^{11} X_i 2^i\right)\left(\sum_{i=4}^{7} X_i 2^i\right) + \left(\sum_{i=0}^{3} X_i 2^i\right) \quad (3)$$

Then, if we wish to multiply "x" by a constant y, the result is:

$$Z = XY = \left(-X_{15}2^{15} + \sum_{i=12}^{14} X_i 2^i\right) Y + \quad (4)$$

$$\left(\sum_{i=8}^{11} X_i 2^i\right) Y + \left(\sum_{i=4}^{7} X_i 2^i\right) Y + \left(\sum_{i=0}^{3} X_i 2^i\right) Y$$

The equation 4 shows that "x" can be multiplied by "y" as a four step process if the results are properly added together. To see how this is done, rewrite equation 4 to be:

$$Z = XY = \left(-X_{15}2^3 + \sum_{i=12}^{14} X_i 2^{i-12}\right) 2^{12} Y + \quad (5)$$

$$\left(\sum_{i=8}^{11} X_i 2^{i-8}\right) 2^8 Y + \left(\sum_{i=4}^{7} X_i 2^{i-4}\right) 2^4 Y + \left(\sum_{i=0}^{3} X_i 2^i\right) 2^0 Y$$

or written another way as:

$$Z = XY = \left(-X_{15}2^3 + \sum_{i=0}^{2} X_{i+12} 2^i\right) Y 2^{12} + \quad (6)$$

$$\left(\sum_{i=0}^{3} X_{i+8} 2^i\right) Y 2^8 + \left(\sum_{i=0}^{3} X_{i+4} 2^i\right) Y 2^4 + \left(\sum_{i=0}^{3} X_i 2^i\right) Y 2^0$$

Therefore, equation 6 suggests that the multiplication algorithm is:

(a) Multiply the four least significant bits ($X_3$, $X_2$, $X_1$, $X_0$) by "y" as if these digits are regular positive numbers.

(b) Multiply the next four bits ($X_7$, $X_6$, $X_5$, $X_4$) by "y" as if these digits are positive numbers and shift the data by four bits (same as multiplying by $2^4$).

(c) Add the results of (a) and (b) together.

(d) Multiply the next four bits ($X_{11}$, $X_{10}$, $X_9$, $X_8$) by "y" as if these digits are positive numbers and shift the data by eight bits (same as multiplying by $2^8$).

(e) Add the result of (d) to the result of (c).

(f) The final four bits must be handled somewhat differently because of the subtraction that occurs if "x" is a negative number. If the number is positive, the $X_{15}=0$ then $X_{14}X_{13}X_{12}$", are multiplied by Y scaled by $2^{12}$ and added to the result in (e). If $X_{15}=1$ (X is negative) then form the sum:

$-X_{15}*8 + X_{14}*4 + X_{13}*2 + X_{12}*1$ and multiply that times "y" and scale the result by $2^{12}$ and add to the result of (e).

This algorithm is implemented in the hardware in a somewhat different manner. Namely, the multiplications at each step are not scaled up before adding to the previous result. Rather, the previous result is scaled down before adding to the multiplied result which appears at the same place in the adder 120 each time. If the accumulated sub answer is scaled by $2^4$ (4 places in binary arithmetic) each time a new product is formed then the equivalent of scaling by $2^4$, $2^8$, $2^{12}$ is accomplished. The path for this scaling occurs through the 2:1 multiplexers 124 shown in FIG. 5. Note that when the bottom four bits from the register 121 at the output of the adder get shifted down by four bits they have nowhere to go and thus disappear. This represents a truncation process in the computations.

The multiplier PROM 118 is used to do all of the multiplication required by the above algorithm. The initial design uses three PROMS with eleven (11) input bits and eight output bits each. Twenty of the twenty-four output bits are utilized. Four of the input bits represent the 4 bit chunks of data "X" that are one input to the algorithm. The seven control bits are allocated as follows:

(a) Five (5) bits are for a code word to represent one of 32 positive constants between zero and one that can be used as the multiplier "y". Note that since the 20 bit output represents the product of y with the particular four bits of x, y effectively has infinite precision and thus the multiplication quantization error is reduced.

(b) One (1) bit represents the sign bit for the 32 words in (a) so that we have a symmetric set of coefficients between ±1.

(c) One (1) bit represents the sensor that tells the PROM 118 that it is seeing the four most significant bits of "x" so that it knows to treat this set of four bits as discussed in (f) above, rather than as the other three sets of four bits.

The sixty-four coefficients are nearly uniformly distributed between $-1$ and $+1$ to provide maximum flexibility in available multiply constants. Since Fourier transforms represent the largest likely user of this preferred hardware implementation, it was decided that the specific constants to be used in this preferred implementation would be those required to perform FFT's up to 64 points and those required to perform non $2^N$ based FFT's such as the prime factor algorithm with small point transforms up to 8 points (i.e. 2, 3, 4, 5, 7, 8). This represents 28 coefficients. Four more were added to provide a more even distribution of the integers.

Table I below is a list of the 32 positive coefficients. There are corresponding negative coefficients for each entry in Table I.

TABLE I

Positive multiplier coefficients available in the preferred design.

| Constant No. | Value | Equation | Constant No. | Value | Equation |
|---|---|---|---|---|---|
| 0 | 0.098017 = | $\sin(2\pi/64)$ | 16 | 0.7071068 = | $\sin(16\pi/64)$ |
| 1 | 0.19509 = | $\sin(4\pi/64)$ | 17 | 0.750000 = | $\frac{3}{4}$ |
| 2 | 0.22252 = | $\cos(4\pi/7)$ | 18 | 0.773010 = | $\cos(14\pi/64)$ |
| 3 | 0.25000 = | $\frac{1}{4}$ | 19 | 0.7818315 = | $\sin(2\pi/7)$ |
| 4 | 0.29028 = | $\sin(6\pi/64)$ | 20 | 0.809017 = | $\cos(4\pi/5)$ |
| 5 | 0.30902 = | $\cos(2\pi/5)$ | 21 | 0.83147 = | $\cos(12\pi/64)$ |
| 6 | 0.33333 = | $\frac{1}{3}$ | 22 | 0.866025 = | $\sin(2\pi/3)$ |
| 7 | 0.38268 = | $\sin(8\pi/64)$ | 23 | 0.881921 = | $\cos(10\pi/64)$ |
| 8 | 0.43388 = | $\sin(6\pi/7)$ | 24 | 0.900969 = | $\cos(6\pi/7)$ |
| 9 | 0.471397 = | $\sin(10\pi/64)$ | 25 | 0.92388 = | $\cos(8\pi/64)$ |
| 10 | 0.50000 = | $\cos(2\pi/3)$ | 26 | 0.951056 = | $\sin(2\pi/5)$ |
| 11 | 0.55557 = | $\sin(12\pi/64)$ | 27 | 0.95694 = | $\cos(2\pi/64)$ |
| 12 | 0.587785 = | $\sin(4\pi/5)$ | 28 | 0.97493 = | $\sin(4\pi/7)$ |
| 13 | 0.62349 = | $\cos(2\pi/7)$ | 29 | 0.98078 = | $\cos(4\pi/64)$ |
| 14 | 0.634393 = | $\sin(14\pi/64)$ | 30 | 0.99518 = | $\cos(2\pi/64)$ |
| 15 | 0.66667 = | $\frac{2}{3}$ | 31 | 1.00000 = | 1 |

Most signal processing functions can be described in a sum of products form as shown below:

$$F = \sum_{i=0}^{n-1} a_i b_i \quad (7)$$

$b_i$ = multipliers
$a_i$ = data

Therefore, the circuitry behind the multiplier 118 must not only accumulate the sub products that form a single multiplication, but also must add several of these results together to form "F". The illustration below shows how this is accomplished in the preferred design:

$$F = XY + E = S + E:$$

$(X_{15}X_{14}X_{13}X_{12})(X_{11}X_{10}X_9X_8)(X_7X_6X_5X_4)(X_3X_2X_1X_0)$ $\underline{Y}$ $(Y_S)(Y_S)(Y_S)(A_4)(A_3)(A_2)(A_1)$
$(Y_S)(Y_S)(B_4)(B_3)(B_2)(B_1)$
$(Y_S)(C_4)(C_3)(C_2)(C_1)$
$(D_4)(D_3)(D_2)(D_1)$ $(S_8)(S_7)(S_6)(S_5)(S_4)(S_3)(S_2)(S_1)$ +
$(E_6)(E_5)(E_4)(E_3)(E_2)(E_1)(0)(0)$ $(F_8)(F_7)(F_6)(F_5)(F_4)(F_3)(F_2)(F_1)$ E is a previous product or sum that has been stored as a 24 bit word in the RAM memory 122 shown in FIG. 5. The following steps occur to form the next product in the accumulator of the device.

(a) A step 1 when we form $A=(X_3X_2X_1X_0)Y$, the adder 120 is not adding to it to form the product. However, the past sum "E" is available to be added and $E_1$, $E_2$, $E_3$ all line up with $A_3$, $A_4$, $Y_S$, respectively and thus can be fed out of the RAM 122 and into the adders 120.

(b) During the next step, we wish to add $B=(X_7X_6X_5X_4)Y$ to this accumulated result which has been shifted down four bits to provide proper alignment. There is also room to add $E_4$ in with $Y_S$ in the most significant bit locations.

(c) Similarly, at Step 3 where we are computing $C=(X_{11}X_{10}X_9X_8)Y$, we can add that result to the previous added result which has been shifted four locations for proper alignment. There is also room to add $E_5$ in with $Y_S$ in the most significant adder bits.

Figure 6:
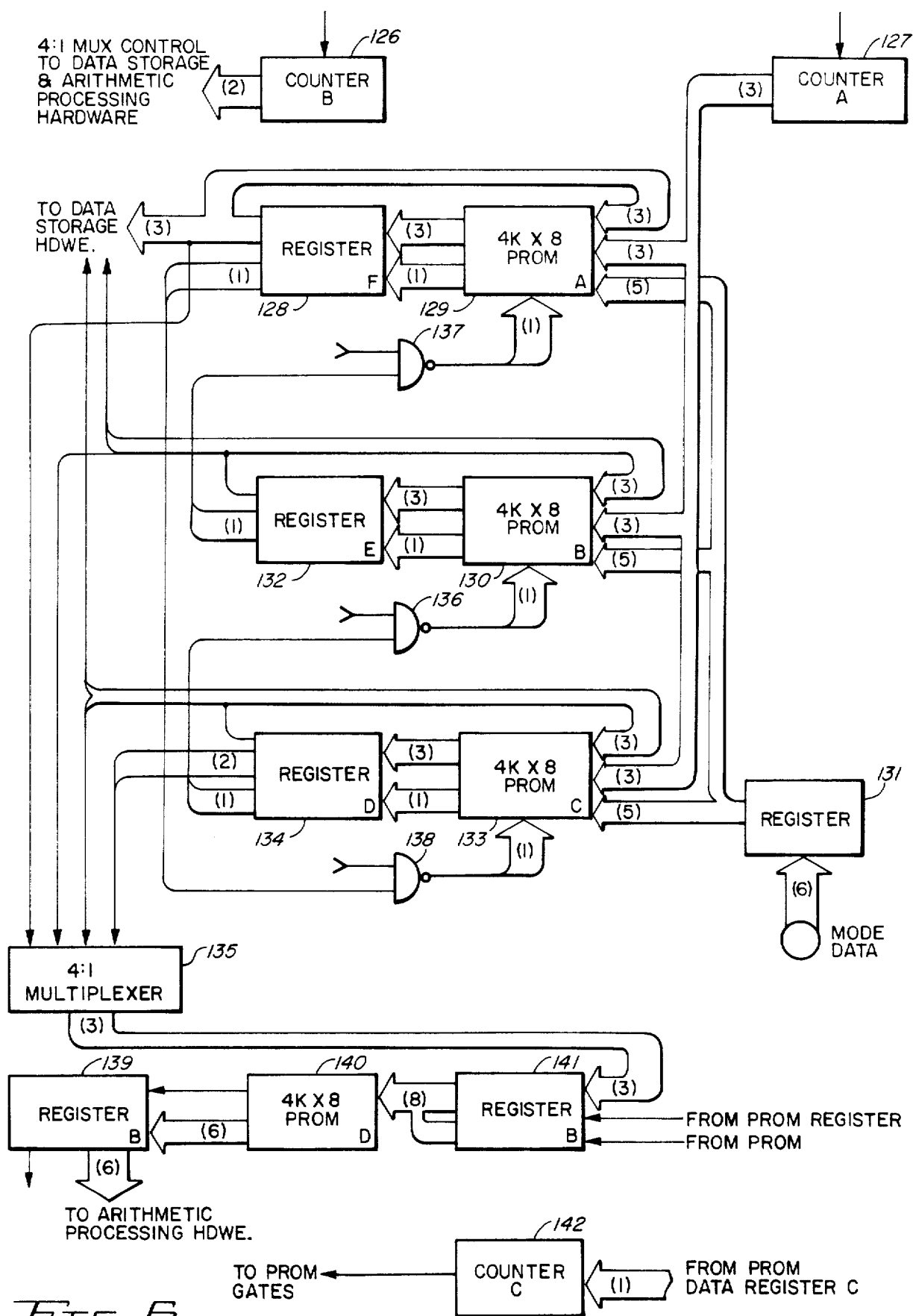
FIG. 6 is a block diagram of the data movement hardware.

(d) Finally, when the most significant bit's four bit product is complete it is again added to the accumulator 121 output which has been shifted down by four bits. Thus, after four steps the new sum is formed. This includes adding E to the accumulated product XY to form F. The necessary sign extensions ($Y_S$) shown in FIG. 6, are added to D by the PROM 118 before it is added to the last partial sum. The purpose of the 4:1 multiplexer 117 is to take $E_3$, $E_4$, $E_5$, $E_6$ that are strobed into the output register 125 of the RAM 122 and feed them into the most significant four bits of the adder 120 in sequential order as described above. The purpose of the 2:1 multiplexer 124 is to feed $E_3$, $E_2$, $E_1$, 0, 0 into one side of the adders 120 below the most significant bits during Step (a) and then to feed the partial sums into those locations for the other three steps.

The tristate register 123 in FIG. 5 is used to transfer data back to the data storage hardware 101. This tristate register 123 is only active at the output when the main memory 114 is writing. In fact, the same signal that is used by the main memory 114 as a read/write strobe is also used as the enable pulse for the tristate register 123 in this preferred implementation. The registers 119 and 121 that straddle the adder 120 run at the full system clock rate. The other registers 123 and 125 are clocked at the apropriate time to efficiently move data.

FIG. 6 shows a hardware diagram for the data movement hardware 103. This hardware controls all of the interfaces to the outside world and all of the control signals for the other three components of the system.

Register A 131 interfaces the mode command with the PTL hardware. PROM's A, B and C 129, 130 and 133, represent a three dimensional addressing scheme whose step changes are preprogrammed in based on the mode data. This allows a variety of different transform techniques to be implemented in one, two or three dimensional processing. The gate 136, 137, 138 on the feedback path to PROMs A, B, C determines when a particular PROM changes count in the addressing scheme and is controlled by counter 142.

Counter A 127 is the step counter which tells the PROM A, B and C, 129, 130, 133, which step in the process is being implemented. The mode information is enough for the PROMs 129, 130 and 133 to know the count sequence in the step of the processing that is active.

Counter B 126 generates the two signals that from the 4:1 multiplexer 116, 117 controllers in the data storage hardware 101 and the arithmetic processing hardware 102.

Prom D 140 is controlled by the length of the particular address dimension that is active and which element in that length is presently being addressed. Based on this sequence it sends a particular multiplier code word to the arithmetic processing hardware 102. Whereas the PROM A, B and C 129, 130 and 133 program data is relatively generic to signal processing since it determines the sequence in which the data moves and there are 32 choices for each of eight steps, the code in PROM D 140 is specific to the application and therefore must change from transform to transform. This can be accomplished by having a larger PROM memory bank instead of just PROM D 140 and multiplexing the appropriate one; physically changing the PROM D 140 as a plug in module to a computer or by replacing the PROM D 140 hardware with RAM hardware which is loaded anew for each transform to be computed. The preferred design considers a fixed PROM 140 customized for the algorithm.

Counter C 142 controls how many times a particular sequence of addresses is cycled before incrementing to a new set of addresses. Counter C 142 is preset to the complement of this number by data stored in PROM A, B, C, 129, 130, 133.

There are also a variety of other control signals and clocks which are generated as a result of what is stored in PROMs A through D, 129, 130, 133, 140, and the state of the counters 126, 127, 142 shown in FIG. 7.

The data movement hardware also includes the initialization hardware which is not shown in FIG. 7. This hardware receives an initialization pulse from the host processor which is asynchronous to the internal PTL clock and synchronizes it and generates clear pulses to all of the resetable registers in the PTL hardware.

I claim:

1. A programmable transform processor comprising in combination:

input and output means for receiving and transmitting data;

data storage means for storing input data and intermediate transform results and for storing completed computational results;

arithmetic processing means for processing input signals including multiplier accumulator means to perform a multiplier accumulator function, said arithmetic processing means having the multiplication function performed as a sequence of products combined in the accumulator portion of said arithmetic processing means simultaneously with the accumulator accumulating the sum of products therein and said arithmetic processing means multiplier accumulator means having an accumulator portion for accumulating partial multiplier products and the sum of the accumulated multiplier products, simultaneously in an adder circuit and said multiplier accumulator means having an accumulation register having a plurality of storage locations therein;

data control means operatively connected to the input and output means, the data storage means and the arithemtic processing means for controlling the input and output of data for the input and output means and the operation of the arithmetic processing means and the control of data to and from the data storage means and said data control means including a memory means which has preprogrammed sequencing data stored therein for addressing said data storage means by individually developing a portion of a data storage address.

2. A programmable transform processor in accordance with claim 1, in which said memory mean has a plurality of preprogramed sequences stored therein, said memory means being operatively coupled to a register means for holding a partial memory address, and each register means also being coupled to said data storage means.

3. A programmable transform processor in accordance with claim 2, in which said memory means is coupled to at least one other memory means for allowing each memory means to operate singularly or simultaneously with at least one other memory means, whereby one, two, or three dimensional data can be sequenced to and from the data storage means.

4. A programmable transform processor in accordance with claim 3, in which each memory means is coupled to at least one other said memory means with a NAND gate operative to couple said memory means responsive to a control signal.

* * * * *